United States Patent [19]
Udagawa

[11] Patent Number: 6,089,573
[45] Date of Patent: Jul. 18, 2000

[54] METAL GASKET WITH CORRUGATED BEAD

[75] Inventor: Tsunekazu Udagawa, Ichikawa, Japan

[73] Assignee: Ishikawa Gasket Co., Ltd., Tokyo, Japan

[21] Appl. No.: 09/038,703

[22] Filed: Mar. 9, 1998

[51] Int. Cl.⁷ .............................. F16J 15/08; F02F 11/00
[52] U.S. Cl. .......................................... 277/593; 277/595
[58] Field of Search ..................................... 277/593, 594, 277/595

[56] References Cited

U.S. PATENT DOCUMENTS

| | | |
|---|---|---|
| 3,889,961 | 6/1975 | Farnam . |
| 4,203,608 | 5/1980 | Nicholson . |
| 4,335,890 | 6/1982 | Nicholson . |
| 4,372,564 | 2/1983 | Nicholson . |
| 4,721,315 | 1/1988 | Ueta . |
| 4,759,556 | 7/1988 | Udagawa . |
| 5,344,165 | 9/1994 | Miyaoh et al. . |
| 5,427,389 | 6/1995 | Ishikawa et al. . |
| 5,570,892 | 11/1996 | Udagawa . |
| 5,711,537 | 1/1998 | Inamura et al. . |

FOREIGN PATENT DOCUMENTS 85419  2/1996  Japan .

Primary Examiner—Anthony Knight
Assistant Examiner—John L. Beres
Attorney, Agent, or Firm—Kanesaka & Takeuchi

[57] ABSTRACT

A metal gasket of the invention is used for an internal combustion engine. The gasket is basically formed of one metal plate extending substantially throughout an entire area of the engine to be sealed. The gasket includes a plurality of cylinder bores and a plurality of liquid holes. At least one corrugated bead is formed in the metal plate to be located around at least one of the liquid holes without forming corrugated beads around all of the liquid holes. The corrugated bead is formed at a portion where a surface pressure sufficient to seal around a liquid hole is not obtained.

7 Claims, 1 Drawing Sheet

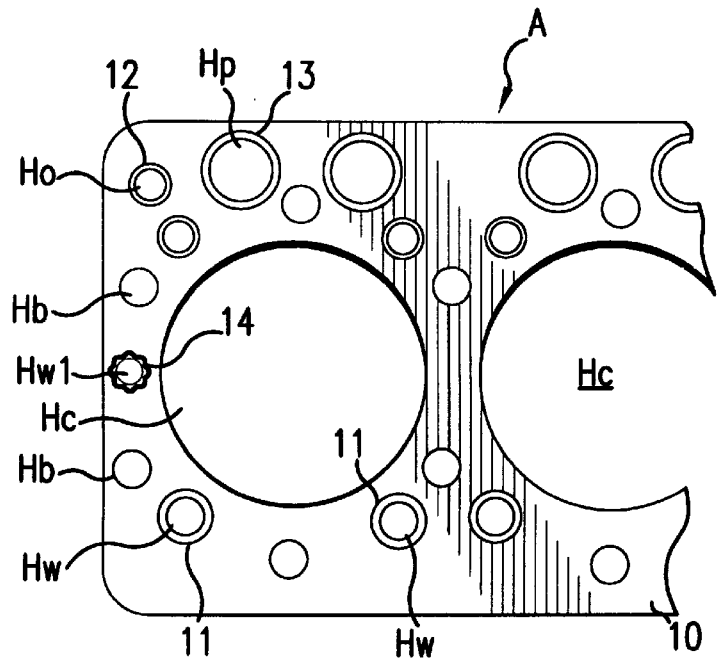
FIG.1
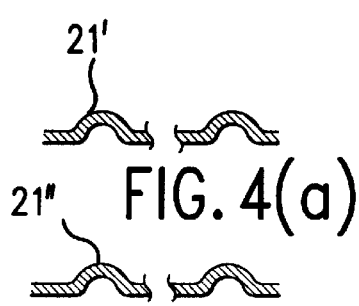
FIG.4(a)
FIG.4(b)
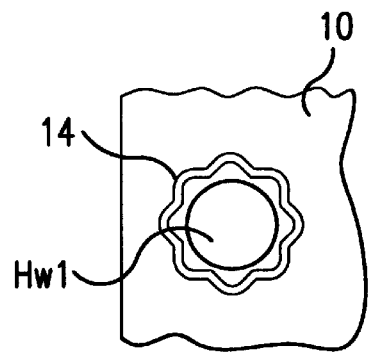
FIG.2
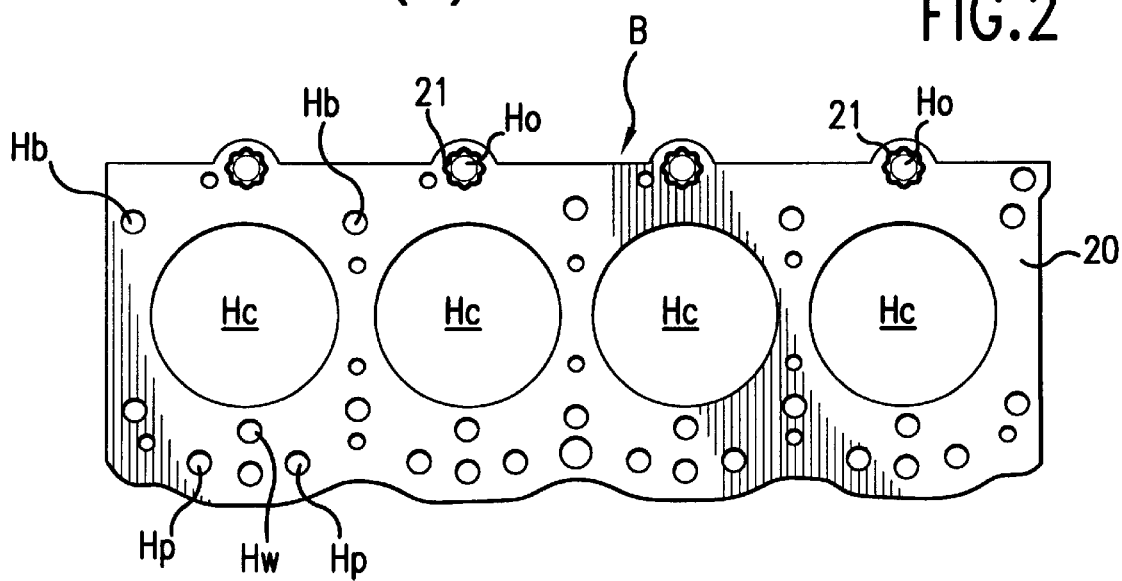
FIG.3

METAL GASKET WITH CORRUGATED BEAD

BACKGROUND OF THE INVENTION AND RELATED ART STATEMENT

The present invention relates to a metal gasket for an internal combustion engine, which includes a corrugated bead to seal around one of liquid holes.

An engine and a gasket installed therein for an automobile include cylinder bores, water holes, oil holes, bolt holes and so on. Since high pressure and temperature are formed in the cylinder bores when the engine is actuated, bolts for securing the engine parts together with the gasket are generally arranged around the cylinder bores to securely seal therearound. Other holes, such as water holes and oil holes, are situated near the cylinder bores, and are sealed by the tightening pressure of the bolts for sealing the cylinder bores.

Therefore, the other holes, i.e. water holes and oil holes, do not generally receive equal tightening pressure from the bolts. As a result, although the other holes have sealing means in the gasket, various sealing problems occur in these other holes.

For example, in case a rigidity of a cylinder head and/or cylinder block is not strong, no matter where a hole to be sealed is located, i.e. even if the hole is located away from or close to the bolt holes, the sealing means of the gasket may not be sufficiently compressed to possibly cause leakage. On the other hand, in case the rigidity of the cylinder head and/or cylinder block is strong, if sealing means for a hole is not strong against a high tightening pressure, the sealing means is weakened or creeps by the high tightening pressure to thereby cause leakage as well. Regardless of the rigidity of the engine, if the sealing means is formed close to the cylinder bore, the sealing means may creep by high temperature to possibly cause leakage.

In order to solve the problems, various attempts have been made. For example, a bead for surrounding a fluid hole is partially doubled at a portion away from the bolt hole to increase the surface pressure at the doubled portion; a strength of a bead surrounding a fluid hole is partially changed to increase the surface pressure; and so on. Also, in U.S. Pat. No. 5,570,892, a portion of a bead away from bolt holes where a high surface pressure is not formed is corrugated to form a wide corrugated bead portion.

The conventional sealing means or beads around the fluid hole can seal properly as intended. However, the sealing can not be always made properly by the conventional sealing means or beads because of the difference of the surface pressure applied to the sealing means.

The present invention has been made in view of the conventional gaskets, and an object of the invention is to provide a metal gasket for an internal combustion engine, which can securely seal around a liquid hole by a corrugated bead.

Another object of the invention is to provide a metal gasket as stated above, which can provide a wide sealing area to withstand high pressure applied thereto.

A further object of the invention is to provide a metal gasket as stated above, wherein the wide sealing area can be easily formed as desired.

Further objects and advantages of the invention will be apparent from the following description of the invention.

SUMMARY OF THE INVENTION

A metal gasket of the invention is used for an internal combustion engine. The gasket is basically formed of one metal plate extending substantially throughout an entire area of the engine to be sealed. The metal plate includes a plurality of cylinder bores, and a plurality of liquid holes.

In the invention, at least one corrugated bead is formed in the metal plate to be located around at least one of the liquid holes without forming the corrugated beads around all of the liquid holes. The corrugated bead is formed at a portion where a surface pressure sufficient to seal around the liquid hole is not obtained.

The corrugated bead has a constant height throughout the entire length thereof and changes distances to the edge of the liquid hole where the corrugated bead surrounds. Thus, a wide area around the liquid hole is covered by the corrugated bead. The corrugated bead can withstand high compression or tightening pressure applied thereto, and widely seal around the liquid hole.

The liquid hole around which the corrugated bead is formed may be located away from a bolt hole where a sufficient tightening pressure is not formed. The liquid hole may be located near a bolt hole where a sufficient tightening pressure is not formed due to insufficient rigidity of a cylinder head and/or a cylinder block. Also, the liquid hole may be located close to the cylinder bore if a bead around the liquid hole is liable to creep due to high temperature of the cylinder bore. The corrugated beads can securely seal around these liquid holes.

In the invention, number, width and height of the corrugations in one corrugated bead may be changed according to the pressures applied thereto. Namely, if the corrugated bead is located away from a bolt hole, number of corrugations of the bead may be changed such that the portion of the bead away from the bolt hole has a large number of corrugations than that close to the bolt hole. Instead of increasing the number of the corrugations, the width of the corrugation may be narrowed or the height of the corrugations may be increased.

In addition, if a bead is to be formed around a liquid hole where high tightening pressure is applied or insufficient tightening pressure is formed, the bead may be a corrugated bead according to the invention. The corrugated bead resists high tightening pressure and provides wide surface pressure to effectively seal around the liquid hole.

In the invention, the metal plate with the corrugated bead may have sealing means for other holes to form a single metal plate gasket. Also, the metal plate may be combined with one or more metal plates to constitute a metal laminate gasket.

BRIEF DESCRIPTION OF THE DRAWINGS

FIG. 1 is a partial plan view of a first embodiment of a metal gasket of invention;

FIG. 2 is an enlarged plan view of a part of the metal gasket as shown in, FIG. 1;

FIG. 3 is a plan view of a second embodiment of a metal gasket of the invention; and FIGS. 4(*a*) and 4(*b*) are sectional views for showing modifications of th gasket of the invention.

DETAILED DESCRIPTION OF PREFERRED EMBODIMENTS

With reference to FIGS. 1 and 2, a first embodiment A of a metal gasket of the invention is explained.

The gasket A is a cylinder head gasket formed of one metal plate 10 extending throughout an entire area of an engine to be sealed. The gasket A includes a plurality of cylinder bores Hc, water holes Hw, oil holes Ho, bolt holes Hb, push rod holes Hp, and so on, as in the conventional gasket. Although no sealing means is shown around the cylinder bores Hc, beads or appropriate sealing means are formed around the cylinder bores Hc. Also, beads 11, 12, 13 are formed around the water holes Hw, oil hole Ho and push rod holes Hp.

In the gasket A, a water hole Hw1 is formed at an edge portion of the gasket near the cylinder bore Hc. Since the water hole Hw1 is located close to the cylinder bore Hc, a high temperature is applied to the water hole Hw1.

In the gasket A, a corrugated bead 14 is formed around the water hole Hw1 according to the invention. The corrugated bead 14 projects upwardly from the metal plate 10, and has a predetermined constant height. The distances of the bead 14 to the edge of the water hole Hw1 change like a waving shape. Thus, a wide area in an annular shape is covered by the corrugated bead 14. The number of the corrugations and the area covered by the corrugated bead 14 can be determined by the size of the hole and the pressure applied thereto.

When the gasket A is situated between a cylinder head and a cylinder block (both not shown) and is tightened, the corrugated bead 14 is compressed to provide a surface pressure thereat, which securely seals around the water hole Hw1. A wide area around the water hole Hw1 is sealed by the corrugated bead 14.

Although a high temperature is applied to the water hole Hw1 when the engine with the gasket A is actuated, since the corrugated bead 14 is formed around the water hole Hw1, the corrugated bead 14 does not substantially creep. Namely, heat applied to the corrugated bead 14 is widely spread, and the tightening pressure applied to the corrugated bead 14 per an area is reduced, so that the possibility of causing a creep relaxation at the corrugated bead 14 is significantly reduced. Thus, the water hole Hw1 can be securely sealed without creep relaxation.

In this connection, if a conventional circular bead is formed around the water hole Hw1, since a high temperature is applied to the circular bead, the circular bead may creep and cause water leakage from the water hole Hw1.

In the cylinder head gasket, when the engine is assembled and tightened, high tightening pressures are applied to the longitudinal end portions to bend the middle portion of the cylinder head upwardly. In the gasket A, when the engine is tightened, the high tightening pressures are applied to the longitudinal end portions, as well. However, since the corrugated bead is formed between the bolt holes Hb located at the longitudinal end portion, the corrugated bead supports the tightening pressure thereat. Therefore, the bending of the cylinder head is reduced or prevented.

FIG. 3 shows a second embodiment B of a metal gasket of the invention. The gasket B is formed of a metal plate 20, and includes a plurality of cylinder bores Hc, water holes Hw, oil holes Ho, bolt holes Hb, and push rod holes Hp, as in the gasket A. Sealing means around the cylinder bores Hc, water holes Hw and push rod holes Hp are omitted in FIG. 3, but any sealing means known already in the art can be used for sealing the required holes.

In the gasket B, four oil holes Ho with corrugated beads 21 therearound are formed at a side portion of the gasket B. Since the oil holes Ho are located at the side portion outside the bolt holes Hb, the surface pressures applied thereto when the gasket B is tightened are not so strong.

In the gasket B, the number of the corrugations facing the cylinder bore is less than that of the corrugations facing the edge of the gasket, so that the edge side of the corrugated bead 21 provides a surface pressure greater than the inner side of the corrugated bead 21. Instead of changing the number of the corrugations, the heights of the corrugations 21' facing the edge of the gasket may be made high (FIG. 4(a)), or the widths of the corrugations 21' facing the edge of the gasket may be narrowed (FIG. 4(b)). Since the corrugated beads 21 are formed around the oil holes Ho, the oil holes Ho are widely and relatively equally compressed. Thus, the oil holes Ho can be securely sealed.

In the present invention, although a plurality of liquid holes with sealing means, such as water holes and oil holes, is formed in the gasket, the corrugated beads are not formed around all the liquid holes. Only a few corrugated beads are formed for securely sealing around the liquid holes where sealing can not be made properly. In the invention, the corrugated bead increases compression resistance and provides wide sealing. Thus, the corrugated bead may be located where the surface pressure of the bead is not strong and a creep relaxation is liable to occur.

In the invention, the liquid hole can be securely sealed by the corrugated bead, and leakage of a liquid is substantially prevented. The gasket may be formed of one or more metal plates including the corrugated bead around the liquid hole.

While the invention has been explained with reference to the specific embodiments of the invention, the explanation is illustrative, and the invention is limited only by the appended claims.

What is claimed is:

1. A metal gasket for an internal combustion engine, comprising:
    a metal plate extending in a longitudinal direction to substantially cover an entire area of the engine to be sealed and having two longitudinal end areas,
    a plurality of cylinder bores situated in the metal plate,
    a plurality of bolt holes situated in the metal plate,
    a plurality of liquid holes situated in the metal plate, one of the liquid holes being located in one of the longitudinal end areas near one of the cylinder bores and sandwiched between two of the bolt holes, and
    at least one corrugated bead formed in the metal plate to be located around said one of the liquid holes without forming corrugated beads around all of the liquid holes, said at least one corrugated bead having corrugations throughout an entire length thereof for supporting a surface pressure applied to said one of the longitudinal end areas when the gasket is tightened, to thereby support the surface pressure thereat and to seal around said one of the liquid holes.

2. A metal gasket according to claim 1, wherein said corrugated bead has a constant height throughout an entire length thereof and changes distances to an edge of said one of the liquid holes where the corrugated bead surrounds so that a wide area is covered by the corrugated bead.

3. A metal gasket according to claim 1, wherein one liquid hole is formed in each of the longitudinal end areas and is surrounded by one corrugated bead so that both longitudinal end areas are supported by the corrugated beads.

4. A metal gasket according to claim 3, wherein said corrugated bead has a predetermined number of the corrugations, a number of the corrugations in one side of the corrugated bead being different from that of the corrugations in the other side thereof to provide different surface pressures in said one corrugated bead.

5. A metal gasket according to claim 3, wherein said corrugated bead has portions with different widths to provide different surface pressures in one corrugated bead.

6. A metal gasket according to claim 3, wherein said corrugated bead has portions with different heights to provide different surface pressures in one corrugated bead.

7. A metal gasket for an internal combustion engine, comprising:

a metal plate extending in a longitudinal direction to substantially cover an entire area of the engine to be sealed, and having two lateral end areas extending parallel to the longitudinal direction, a plurality of cylinder bores situated in the metal plate, a plurality of bolt holes situated in the metal plate, a plurality of liquid holes situated in the metal plate, some of the liquid holes being disposed in one of the two lateral end areas and located at a side opposite to the cylinder bores relative to some of the bolt holes, and corrugated beads formed in the metal plate and surrounding entirely around said some of the liquid holes without forming corrugated beads around all of the liquid holes, each of the corrugated beads having corrugations throughout an entire length thereof, which change distances to an edge of each of the liquid holes where the corrugated bead surrounds so that a wide area is covered by the corrugated bead, a low surface pressure portion facing the cylinder bore, and a high surface pressure portion located at a side opposite to the lower surface pressure portion so that when the gasket is compressed, said some of the liquid holes are relatively equally compressed to be securely sealed.

* * * * *